A. V. AND R. L. HINMAN.
MILKING MACHINE.
APPLICATION FILED DEC. 10, 1915.
1,330,114.
Patented Feb. 10, 1920.
2 SHEETS—SHEET 1.
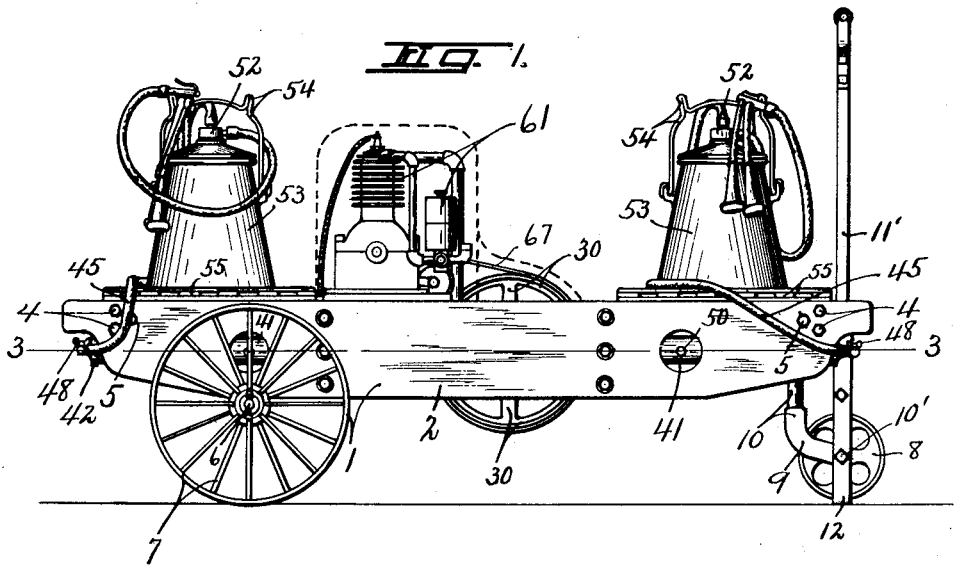
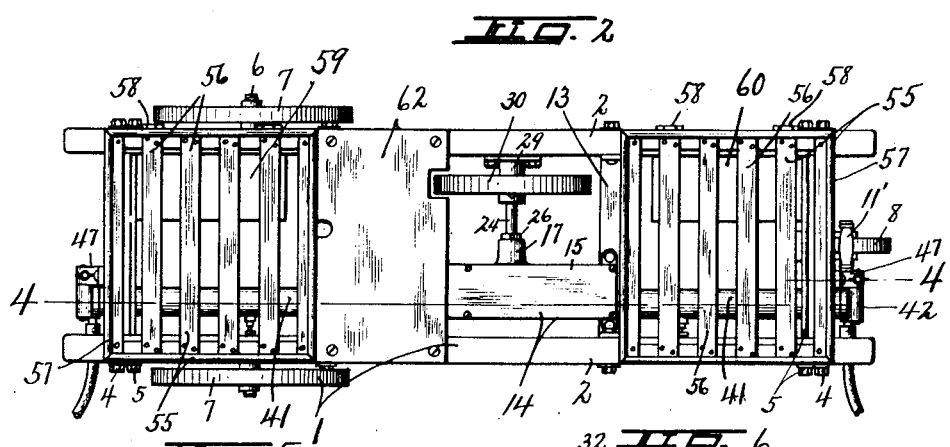
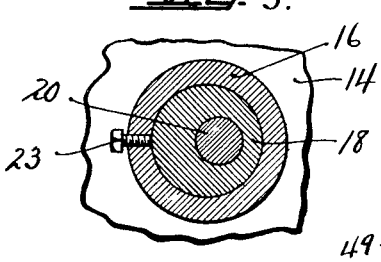
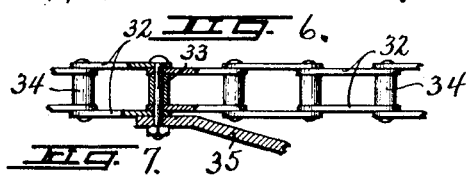
A. V. Hinman and
R. L. Hinman
INVENTORS
BY Howard P. Denison
ATTORNEY.
WITNESSES:

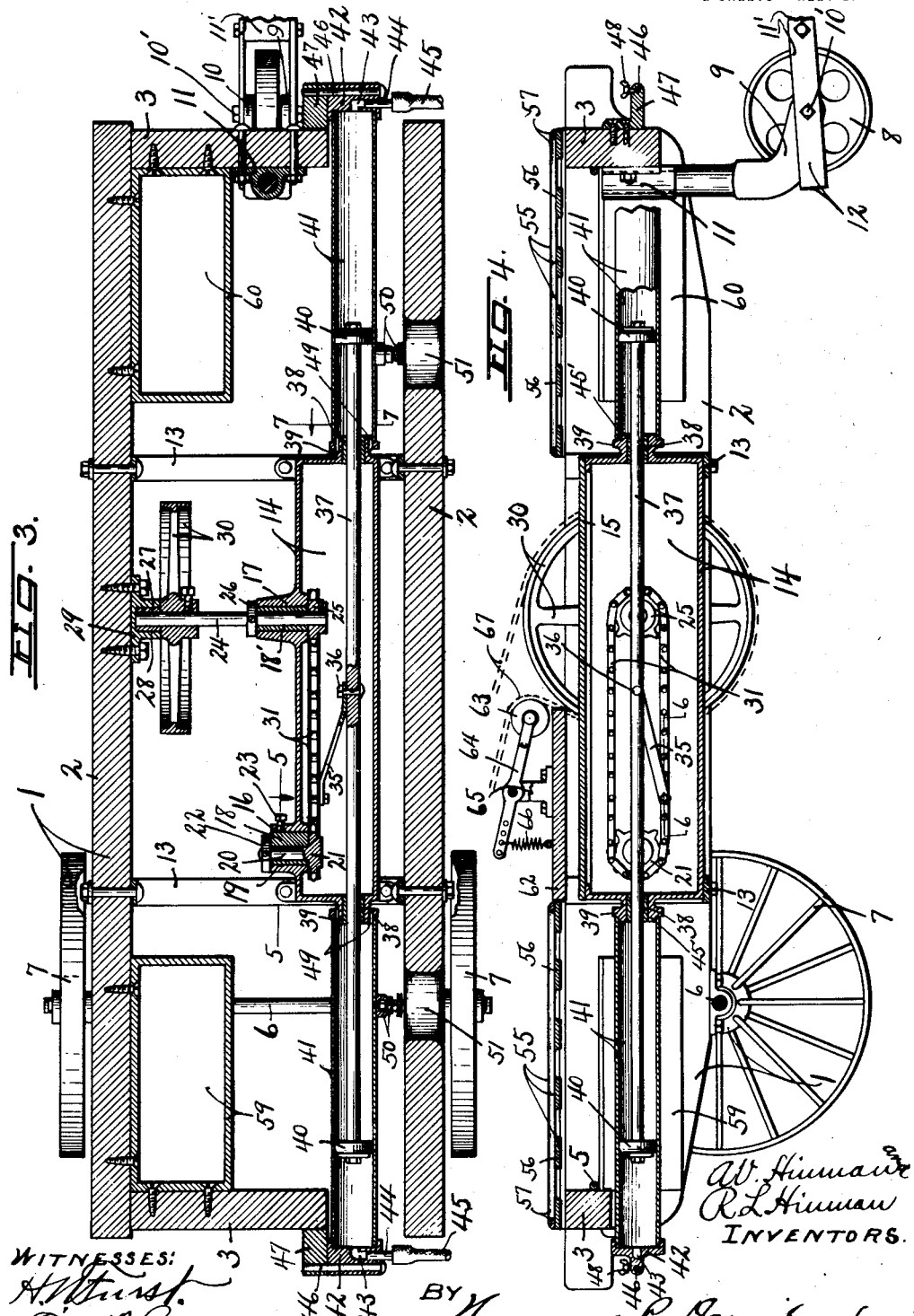

UNITED STATES PATENT OFFICE.

ARTHUR V. HINMAN AND RALPH L. HINMAN, OF ONEIDA, NEW YORK.

MILKING-MACHINE.

1,330,114.  Specification of Letters Patent.  Patented Feb. 10, 1920.

Application filed December 10, 1915. Serial No. 66,138.

*To all whom it may concern:*

Be it known that we, ARTHUR V. HINMAN and RALPH L. HINMAN, citizens of the United States, and residents of Oneida, in the county of Madison, in the State of New York, have invented new and useful Improvements in Milking-Machines, of which the following, taken in connection with the accompanying drawings, is a full, clear, and exact description.

This invention relates to certain new and useful improvements in cow milking machines, and is particularly adapted to that class of milking machines in which the vacuum for producing pulsations in teat cups and for drawing milk into a receptacle is created by a relatively long-stroke, small diameter piston pump.

The primary object of the invention is to produce a power-driven self-contained portable apparatus which may be used in any desired place, either in the stable or outside, and avoids entirely the necessity of installing the machine in a stable and of re-designing the stable to adapt it to known machine operation, and omits the positioning of drive rods and other movable parts upon or about the stanchions.

A further object resides in producing a machine adapted for milking a number of cows, as for instance four, without moving the machine and in using a single source of power, as a small motor of the gasolene or other type, for operating two milking machine units' simultaneously to alternately produce vacuum in each.

Other objects and advantages relate specifically to the construction and method of operation by which the above advantages are attained, and to the details of such construction whereby the machine is rendered practically noiseless and highly efficient in operation. All of which will more clearly appear from the following description, taken in connection with the accompanying drawings, in which—

Figure 1 is a side elevation of the machine.

Fig. 2 is a top plan view of the same with the motor, milk pails, and parts carried by the pails removed.

Fig. 3 is a cross section on line 3—3, Fig. 1.

Fig. 4 is a cross section on line 4—4, Fig. 2.

Fig. 5 is a cross section on line 5—5, Fig. 3.

Fig. 6 is a detail, partly in section, of the driving chain and connection between the chain and crank.

Fig. 7 is a cross section on line 7—7, Fig. 3.

The invention as shown comprises a suitable chassis —1— comprising side bars —2— and cross-bars —3— intermediate the ends of the side bars and secured thereto in any suitable manner, as by bolts —4—, with preferably a bolt —5— extending parallel with the cross pieces and connecting the opposite sides —2—. Preferably the ends of the sides are shaped to form gripping handles for carrying or lifting the machine if that should become desirable.

The rear portion of the framework formed by the side and cross or end bars is supported upon an axle —6— carried by wheels —7—. The forward end of the framework is carried in any suitable manner, as by a single wheel —8— rotatably journaled between the arms —9— of a yoke —10— having its upper end swivel connected to the forward cross bar —3— by a bracket —11— secured to the cross bar and provided with a bearing for receiving the unitary end of the yoke. The upper end of the bearing may be closed to prevent movement of the end of the yoke through the bearing.

A suitable draft handle is connected to the wheel —8— and the yoke —10— by mounting the same upon the bolt —10'— forming the connection between the wheel and yoke, and preferably this draft handle is provided with a looped end —12— alined with the handle and disposed upon the opposite side of the wheel —8— from said handle so that when the draft handle is raised upwardly about the pivot bolt —10'— a portion of the loop is moved underneath the wheel to space the wheel from the supporting floor or ground and prevent movement of the machine.

The chassis —1— is provided preferably upon opposite sides of its longitudinal center with U-shaped members —13— formed of flat sheet metal or other suitable material having their opposite sides secured respectively to the side members —2— and their bottom portions extending across the opening between said side members to form spaced supports for a gear box —14— comprising an elongated structure having a removable cover —15— allowing access to the interior of the box.

The box —14— is preferably positioned to one side of the longitudinal axis of the chassis —1— and adjacent one of the side members —2— and may be formed of metal or other suitable material, and is provided upon its inner side with a pair of spaced bearings —16— and —17—, respectively.

The bearing —16— is formed by a boss extending, as shown, both inwardly and outwardly from the side wall of the box —14— and has positioned within it a sleeve —18— having an eccentric opening —19— for receiving a stub shaft —20— having integral therewith or mounted thereon within the box a gear —21—, and having a sleeve or collar —22— mounted upon its outer end and bearing against the boss forming the bearing —16— and against the sleeve —19—. The collar —22— may be held in place in any suitable manner, as by a set screw.

It will be readily apparent that by turning the sleeve —19— within the bearing —16— the position of the gear —21— laterally of the box may be adjusted to any predetermined distance and the sleeve is held in proper adjusted position by a set screw —23—.

The bearing —17— is likewise formed in a boss extending inwardly and outwardly from the box —14— and is provided with a sleeve —18— having a longitudinal opening adapted to receive a rotary shaft —24— having gear —25— mounted thereon within the box —14— and rigidly secured thereto in any suitable manner so as to rotate in unison therewith. This shaft is likewise provided with a collar —26— bearing against the outer surface of bearing —17— and secured to the shaft in any suitable manner, as by a set screw, to prevent longitudinal movement of the shaft. The opposite end of the shaft is journaled in a sleeve —27— supported within a bearing —28— formed in a bracket —29— secured to the adjacent side bar —2— in any suitable manner, as by screws.

A pulley —30— of relatively large diameter is secured to the shaft —24— adjacent the bracket —29— in any suitable manner, as by a set screw, so that the shaft will rotate in unison with the pulley. The gears —21— and —25— are connected by a suitable belt —31— so that the rotation of one of said gears is transmitted to the other gear by the movement of the belt. This belt may be formed as shown of longitudinal side pieces —32— and connecting cross bolts —33— embodying rotary sleeves —34—, and to one of the cross bolts outside the longitudinal pieces of the belt or chain a link —35— is secured, so that it may rock around the bolt as a pivot.

The opposite end of the link is offset somewhat from the plane of the end connected to the belt or chain and is in turn connected, as by bolt —36—, to a reciprocating rod —37— extending through sleeves —38— mounted in bosses —39— formed upon the opposite ends of the box —14—. The opposite ends of the rod —37— are each provided with suitable pistons —40— movable in cylinders —41— of relatively great length and small diameter, which cylinders have their open inner ends fitted over the bosses —39— and their opposite ends closed by suitable end members —42— having air conduits —43— therethrough provided with projecting nipples —44— for engagement with suitable air conveying members, as the flexible tubes —45—.

Preferably the bosses —39— are provided with an inwardly stepped circular portion —45'— of a diameter only slightly less than the interior diameter of the cylinders —41— and over which the cylinder is adapted to be tightly fitted so that its end portion is in substantial contact with the body of the boss at the base of the stepped portion —45'—.

The end members —42— are also preferably provided with laterally extending conduits for the reception of bolts or spindles —46— having their ends projecting into alined openings in brackets —47— projecting from and secured to the cross bars —3—, said bolts secured in assembled position in the bracket in any suitable manner, as by thumb screws —48—.

By this construction the cylinder —41— is held from longitudinal movement by the spaced supports constituted by the bosses —39— and the brackets —47—. Preferably the bosses —39— are provided with openings —49— extending through stepped portion —45'— and the body of the boss, allowing communication between the inner end of the pump cylinder and the atmosphere to release the air upon the return-stroke of the rod —37— carrying piston —40—.

Preferably the pump cylinders —41— are provided with valves —50— adapted to be adjusted to prevent the creation of vacuum in the cylinders beyond a predetermined point, and for this purpose the adjacent side member —2— is provided with openings —51— alined with the adjustable screw member of said relief valves —50—. The flexible air conveying tubes —45— are connected in the usual manner to a valve chamber —52—, which chamber is in turn adapted to be connected by a flexible hose and teat cups to the animal to be milked.

The construction of valve chamber and the connections of the same here generally described are preferably the same as those disclosed in our reissue Letters Patent No.

13,876 or in our application Serial No. 865,319, and the valve chamber is preferably associated with and adapted to discharge into a suitable pail —53— which is provided with a bail —54— automatically locked in vertical position by its own gravity, as disclosed in application of Arthur V. Hinman, Serial No. 21,724.

The pails and teat cups, hose, etc., carried by the bails thereof are adapted to be supported upon and carried by the chassis —1—, and for this purpose the opposite ends of the chassis are provided with covers —55— formed preferably of spaced slats —56— and an upstanding edge flange or bead —57— for preventing sliding of the pails from the chassis. These covers are preferably hinged at one side to one of the members —2—, as by hinges —58—, and beneath the oppositely disposed covers are positioned a tool box —59— and a battery box —60—, the battery box adapted to carry a battery constituting the ignition for a suitable motor, as the internal combustion motor —61— mounted upon a cross plate —62— carried by and secured to the opposite members —2— of the frame, as by screws or otherwise. Preferably the motor is mounted at substantially the center laterally of the chassis, and its crank shaft is provided with the usual relatively large balance or fly wheel, and also with a relatively small and preferably axially alined motor driven belt pulley, not shown, of such size that when correlated with the pulley —30— the rod —37— will have substantially forty-eight reciprocal movements per minute, thereby producing substantially forty-eight pulsations in the teat cups through the pump, pail and hose connections.

A suitable belt tightening wheel —63— is rotatably mounted upon one end of an arm —64— pivoted intermediate its ends upon a standard —65— secured to the cross plate —62—. The rear end of the arm —64— is provided with an opening, or preferably with a plurality of openings, or other means for removably attaching a spring —66— or similar tensioning device to draw the roller —63— tightly into contact with the belt —67— shown in dotted lines, for tensioning the same.

The engine and driving parts, such as pulley —30—, may be inclosed or covered by a casing or cap as of screen wire or other suitable material, which prevents contact of an operator or animal with the operating apparatus and at the same time allows the free entrance of air for cooling the motor. Such a hood or closure is indicated in dotted lines, Fig. 1.

It will be apparent that the box —14— is positioned longitudinally centrally of the chassis and is provided at its opposite ends with pump cylinders; that the gears —21— and —25— and belt or chain —31— are positioned toward one end of the box —14—, leaving a distance between the effective operating face of one of the gears and the end of the box equal to the longitudinal extension of the crank arm —35—.

It will be further noted that the crank arm is connected to the rod —37— at a point offset from the longitudinal center thereof, and that the distance between the outermost points of the effective operating surfaces of the gears —21— and —25— is slightly less than the length of the effective longitudinal stroke of the opposite ends of the rod —37— carrying valves —40— constituting the pump pistons.

As an instance of the application of the machine, it is adapted to be drawn in the stable at the rear of the cows and positioned at any suitable point by a single operator, without any permanent fixtures in the stable or any moving parts around the stanchions. The pails may be taken from the machine and set in a desired position, the motor started and the teat cups attached to the respective cows. When these two cows are milked, the teat cups may be removed from the cows as the operation is completed and attached to the two other adjacent cows. When the four animals have been milked, the machine may be removed into position to milk four others, the pails being set upon the machine and the entire structure as a unitary article moved to the desired position. The motor should be provided with suitable muffling devices or means, all of which is well known in the art and not necessary to herein describe.

Although we have shown and described one particular construction of apparatus and certain form, position and arrangement of the parts thereof as preferable, we do not desire to limit ourselves to the same, as many changes may be made in the form, construction, position and arrangement of the parts, and in the details of operation, without departing from the spirit of this invention as set forth in the appended claims, and it will be obvious that the vacuum producing devices and the mechanism for producing vacuum therein may be duplicated upon the same chassis and may be driven from the unitary source of power, as the motor shown. The gear-box —14— is adapted to contain a suitable lubricant for oiling the driving mechanism.

What we claim is:—

1. In a portable milker, a wheel supported chassis, a pump cylinder, a transmission comprising two rotary members and a belt driven thereby, a reciprocating rod provided with a piston movable in said pump cylinder, said belt connected to said rod to reciprocate the same, motor means for driving said belt, all of said named parts carried by said chassis, a vacuum chamber, hose connections between pump and vacuum chamber, teat-cups and hose connections between the vacuum chamber and teat-cups.

2. In a portable milker, a wheel supported chassis, a gear box mounted on said chassis, pump cylinders positioned at opposite ends of the gear box, pistons movable in respective pump cylinders, a transmission in said box comprising two rotary members and a belt for driving said pistons, motor means for driving said gearing, a pair of vacuum chambers, hose connections between respective vacuum chambers and pumps, teat-cups and hose connections between respective vacuum chambers and teat-cups.

3. In a milking apparatus, a chassis, a pair of pump cylinders mounted on said chassis, a reciprocating rod mounted on said chassis and having a piston at each of its ends mounted respectively in the pump cylinders, a link connected to the rod, and motor driven means mounted on said chassis for moving the link to reciprocate said rod.

4. In a milking apparatus, a chassis, a pair of pump cylinders mounted on said chassis, a reciprocating rod mounted on said chassis and having a piston at each of its ends mounted respectively in the pump cylinders, a pair of gears, a belt moving with said gears, and connection between the belt and the rod whereby the rod is reciprocated upon rotation of said gears.

5. In a milking apparatus, a chassis, a gear box mounted on said chassis, pump cylinders positioned at opposite ends of the gear box, a rod journaled in opposite ends of the gear box and provided with pistons movable respectively in the pump cylinders, gearing in said box for reciprocating said rod.

6. In a milking apparatus, a chassis, a gear box mounted on said chassis, pump cylinders positioned at opposite ends of the gear box, a rod journaled in opposite ends of the gear box and provided with pistons movable respectively in the pump cylinders, a pair of spaced journals in said box, shafts mounted in said journals, gears mounted on said shafts, a chain belt mounted on said gears, a link connecting said belt to said rod, and means for driving one of said shafts.

7. In a milking apparatus, a chassis, a gear box mounted on said chassis, bosses projecting from the opposite ends of said gear box, bearings formed in said bosses, pump cylinders having their ends engaged respectively with said bosses, a reciprocatory rod journaled in said bearings and provided with pistons positioned respectively in the pump cylinders, gearing in said box for reciprocating said rod, and means mounted on said chassis for driving said gearing.

8. In a milking apparatus, a chassis, a gear box mounted on said chassis, bosses projecting from the opposite ends of said gear box, pump cylinders having their ends engaged respectively with said bosses, said bosses provided with bearings communicating with the adjacent ends of said pump cylinders, a reciprocatory rod journaled in said bosses and provided with pistons positioned respectively in the pump cylinders, gearing in said box for reciprocating said rod, and means mounted on said chassis for driving said gearing.

9. In a milking apparatus, a chassis, a gear box mounted on said chassis and having a bearing formed in one end, a pump cylinder positioned adjacent the end of said box in which said bearing is formed, a reciprocatory rod journaled in said bearing and having a piston mounted thereon positioned in said cylinder, gearing in said box for reciprocating said rod, and means for driving said gearing.

10. In a milking apparatus, a chassis, a gear box mounted thereon and having a boss projecting from one of its ends, a pump cylinder having one of its ends engaged with said boss, a valve chamber operably connected to the other end of said cylinder, said boss provided with a bearing, a rod journaled in said bearing and having a piston in connection therewith positioned in said pump cylinder, and gearing in said box for reciprocating said rod.

11. In a milking apparatus, a chassis, a gear box mounted thereon and having a boss formed upon one of its ends, a pump cylinder having one end slidably engaged with said boss, a bracket mounted on said chassis, and means for connecting the opposite end of said pump cylinder to said bracket, a piston movable in said cylinder, and means for reciprocating the piston.

12. In a milking apparatus, a chassis, a motor mounted on said chassis, a shaft rotatably mounted on said chassis, connection between the motor and the shaft for driving the latter, a stub shaft mounted on said chassis, gears on said shafts, a chain belt mounted on said gears, a reciprocating rod having pistons upon its opposite ends, pump cylinders in which said pistons are respectively movable, and a link connecting said belt to said rod for reciprocating the same.

13. In a milking apparatus, a chassis, a motor mounted on said chassis, a shaft rotatably mounted on said chassis, connection between the motor and the shaft for driving the latter, a stub shaft mounted on said chassis, gears on said shafts, a chain belt mounted on said gears, a reciprocating rod having pistons upon its opposite ends, pump cylinders in which said pistons are respectively movable, a link connecting said belt to said rod for reciprocating the same, each cylinder provided with an opening for releasing the air in the pump cylinders upon the return movement of the piston in its respective cylinder.

14. In a milking apparatus, a chassis, spaced bearings carried by the chassis, pump cylinders alined with the respective bearings, means for rigidly supporting the outer ends of the pump cylinders, a reciprocating rod journaled in said spaced bearings and having pistons upon its opposite ends movable in respective pump cylinders, and means engaged with said rod intermediate said bearings for reciprocating the same.

15. In a milking apparatus, a chassis, spaced bearings carried by the chassis, pump cylinders alined with the respective bearings, means for rigidly supporting the outer ends of the pump cylinders, a reciprocating rod journaled in said spaced bearings and having pistons upon its opposite ends movable in respective pump cylinders, means engaged with said rod intermediate said bearings for reciprocating the same, valve chambers, and connections between the pump cylinders and the valve chambers.

16. In a milking apparatus, a chassis, spaced bearings carried by the chassis, pump cylinders alined with the respective bearings, means for rigidly supporting the outer ends of the pump cylinders, a reciprocating rod journaled in said spaced bearings and having pistons upon its opposite ends movable in respective pump cylinders, means engaged with said rod intermediate said bearings for reciprocating the same, valve chambers and connections between the pump cylinders and the valve chamber, teat cups and connections between the teat cups and the valve chambers.

17. In a milking apparatus, a wheel chassis, a box mounted on said chassis, bosses projecting from the opposite ends of said box and having alined bearings formed therein, pump cylinders having their inner ends engaged respectively with said bosses, separate means for rigidly supporting the outer ends of said pump cylinders, a piston rod journaled in said bearings and having pistons movable in respective pump cylinders, and means for reciprocating said rod to produce vacuum alternately in said pump cylinders.

18. In a milking apparatus, a wheel chassis, a box mounted on said chassis, bosses projecting from the opposite ends of said box and having alined bearings formed therein, pump cylinders having their inner ends engaged respectively with said bosses, separate means for rigidly supporting the outer ends of said pump cylinders, a piston rod journaled in said bearings and having pistons movable in respective pump cylinders, and means, including a positively driven rotary shaft and a link arm, for reciprocating said rod to produce vacuum alternately in said pump cylinders.

19. In a milking apparatus, a wheel chassis, a box mounted on said chassis, bosses projecting from the opposite ends of said box and having alined bearings formed therein, pump cylinders having their inner ends engaged respectively with said bosses, separate means for rigidly supporting the outer ends of said pump cylinders, a piston rod journaled in said bearings and having pistons movable in respective pump cylinders, means, including a positively driven rotary shaft, belt gearing driven thereby, and a link arm connecting the belt gearing and the rod, for reciprocating the same to produce vacuum alternately in said pump cylinders.

20. In a milking apparatus, a wheel chassis, a box mounted on said chassis, bosses projecting from the opposite ends of said box and having alined bearings formed therein, pump cylinders having their inner ends engaged respectively with said bosses, separate means for rigidly supporting the outer ends of said pump cylinders, a piston rod journaled in said bearings and having pistons movable in respective pump cylinders, means, including a positively driven rotary shaft, belt gearing driven thereby, and a link arm connecting the belt gearing and the rod, for reciprocating the same to produce vacuum alternately in said pump cylinders, valve chambers, connections between the pump cylinders and respective valve chambers, teat cups and connections between the teat cups and the valve chambers.

In witness whereof we have hereunto set our hands this 3rd day of December, 1915.

ARTHUR V. HINMAN.
RALPH L. HINMAN.

Witnesses:
R. H. WOOLVER,
ELODIE Y. BUCKMAN.